United States Patent Office 3,284,669
Patented Nov. 8, 1966

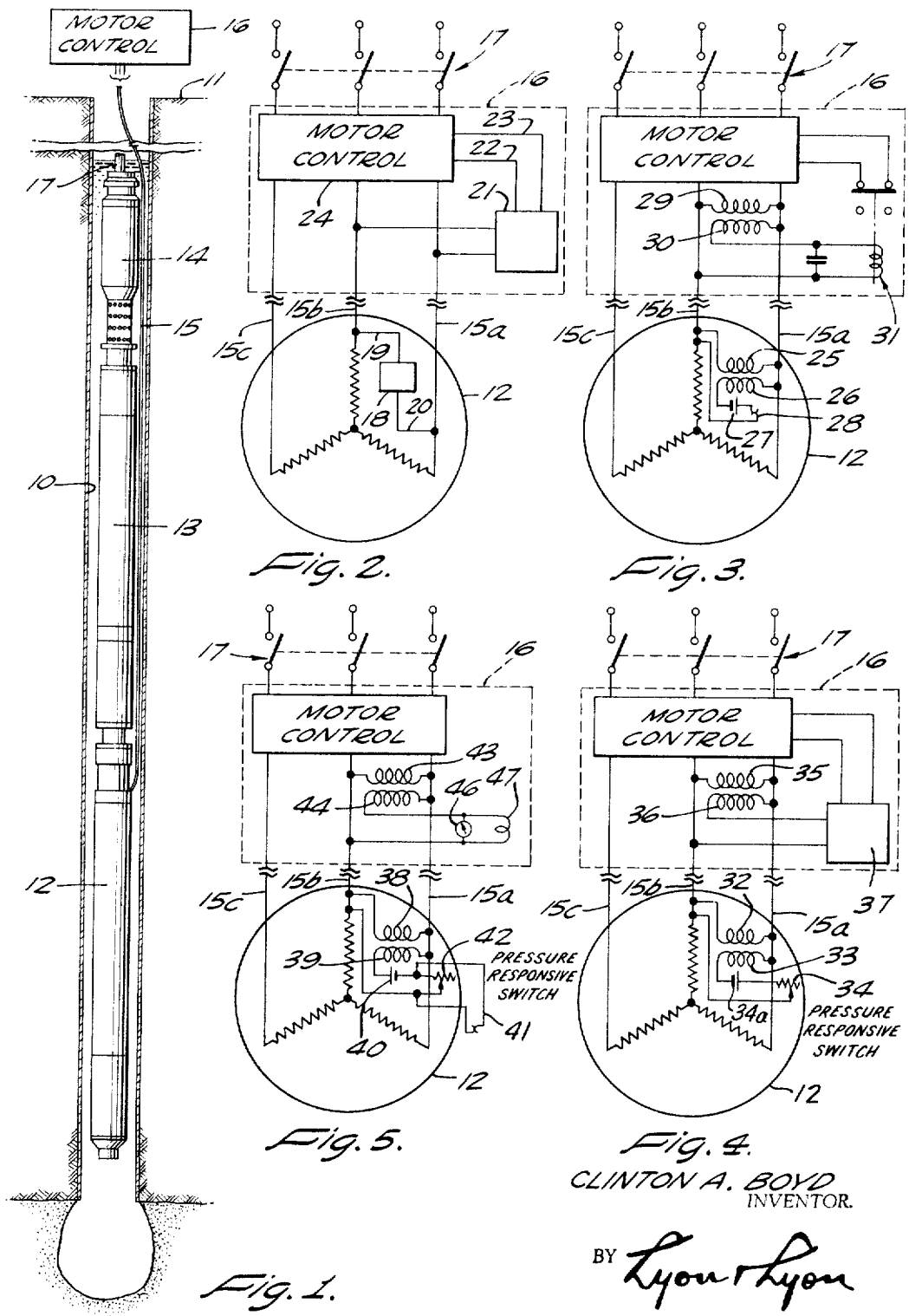

3,284,669
PRESSURE AND HEAT SENSING MEANS FOR SUBMERSIBLE MOTORS
Clinton A. Boyd, Tulsa, Okla., assignor to Borg-Warner Corporation, Chicago, Ill., a corporation of Illinois
Filed Nov. 28, 1962, Ser. No. 240,552
6 Claims. (Cl. 317—13)

This invention relates to means for sensing a physical condition present at or near an electric motor and indicating this physical condition at a location remote from the motor and, in particular, is directed to a motor overheat protector and down-hole pressure sensing device for use with submersible pump-motor units for deep wells.

In pumping the fluid from oil or water wells, it is becoming more conventional under certain conditions to use a submersible electric motor and pump unit positioned near the bottom of the well rather than well-installed pumps operated by ground level mounted motors. It is conventional to provide overheating protection on electric motors for electrically disconnecting the motor upon overheating which may be due to overloading or insufficient circulation of cooling fluid in the types of motors employing circulating fluid for cooling. Electric motor protectors are usually either a heat actuated switch installed in the motor for breaking the electrical circuit upon excessive heat or a circuit breaker operative responsive to excessive current to the motor or both.

While these normal types of overload and overheat protection are satisfactory for electrical motors installed above ground and the smaller sizes of submersible motors, these protection devices have been found unsatisfactory for larger sizes of submersible electric motors. The heat actuated type switch which is installed in the motor for overheating protection is arranged to conduct the normal operating (power) current to the motor. This arrangement is particularly unsatisfactory and impractical in large submersible motors in that such a switch of sufficient size to conduct the normal current to the motor would be too large to properly position the switch within the motor in a location which would sense the overheating of the motor. The remotely located circuit breaker type of overload protector which is responsive to excessive current to the motor is unsatisfactory in a submersible motor in that damaging overheating can occur due to such factors as improper circulation of the fluid which is cooling the motor without being evidenced by a sufficient increase in current to actuate the circuit breaker.

While it would provide adequate protection to have a heat-sensing device in the submersible motor and actuate a remotely located circuit breaker through a separate circuit, such a system would require wiring separate from the power cable and the cost of such wiring would be prohibitive in deep well installations. The circuit breaker would necessarily be located above ground level to permit resetting after overheating causes actuation of the circuit breaker.

Further, in deep wells, it is desirable to be able to ascertain the well fluid pressure present at or near the pump. As is well known in the art, by knowing this down hole pressure, it is possible to ascertain other valuable information and to determine such factors as optimum pumping rates. For example, with the down hole pressure and a knowledge of the fluid level in the well, ascertained by other methods, the specific gravity of the fluid may be determined.

Accordingly, by this invention, there is provided an arrangement whereby a physical condition such as temperature or pressure may be sensed at or near an electrical motor, and this temperature or pressure detected at a location remote from the motor through the use of the power cable to the motor as the means for transmitting the signal concerning the temperature or pressure.

It is a principal object of this invention to provide a device and arrangement for sensing a physical condition and superimposing a signal on the current transmitted by a power cable where the signal may be detected and interpreted at a remote location to determine the physical condition sensed.

Another object of this invention is to provide a novel device for sensing the temperature of a submersible electric motor and/or the fluid pressure surrounding the motor, transmitting a particular signal superimposed upon the power current conductors to the motor, and detecting this particular signal at a remote location for indicating the sensed temperature and/or pressure.

A further object of this invention is to provide a novel form of device for overheat protection for a large submersible motor wherein overheating is sensed by a temperature probe in the motor and an electrical signal is superimposed upon two of the power current conductors through the use of a bucking transformer connected across the two conductors at the motor and, further, wherein such signal is detected at a remote location by a second bucking transformer connected across the same two conductors for actuating a circuit breaker upon overheating as indicated by the temperature probe. A still further object is to provide such an arrangement with a pressure sensitive probe for remotely indicating pressure through a signal superimposed on the power current conductors.

A more detailed object of this invention is to provide an overheat protection for large electric motors wherein the temperature probe is small and may be properly located in the motor and a circuit breaker is remotely located and actuated by such temperature probe through the use of a signal transmitted on the motor current conductors.

Other and more detailed objects and advantages of this invention will appear from the following description and the accompanying drawings.

In the drawing:
FIGURE 1 is a fragmentary elevation view of a typical installation of a submersible electric motor and pump unit in a well bore.
FIGURE 2 is a schematic circuit diagram, partly in block form, of the sensing and detecting device of this invention as used with a three-phase electric motor.
FIGURE 3 is a schematic circuit diagram similar to FIGURE 2 showing a specific embodiment of this invention.
FIGURE 4 is a schematic circuit diagram similar to FIGURE 2 showing a modified embodiment of this invention.
FIGURE 5 is a schematic circuit diagram similar to FIGURE 2 showing a further modified embodiment of this invention.

Referring now to FIGURE 1, there is shown a well bore 10 with a large portion broken away between the bottom portion of the well bore and the ground level 11. It will be seen from the following description that this invention is applicable to any depth of well bore but is particularly well suited and advantageous when used in deep wells due to such factors as the large size and type of electric motors used and the length of additional separate wiring which would be needed without this invention. The submersible electric motor and pump unit may be of any conventional type such as the type shown having an electric motor 12, a seal section 13, and a pump 14. As is conventional in this type of unit, the motor 12 contains a lubricating and cooling fluid which is circulated through the motor during operation and seal section 13 may also contain this fluid. A power cable 15 extends from electric motor 12 upwardly in the well bore 10 above ground level 11 to a control panel, generally designated 16, which is in turn connected to an electric power source. A pipe or tube 17 extends from pump 14 to above ground level 11 for conducting the pumped fluid.

For purposes of description, it will be assumed that motor 12 is a three-phase motor since this is the type most commonly used in deep well motor-pump units, although it will readily appear to those skilled in the art that the invention is equally applicable to single-phase or other poly-phase electric motors. In FIGURES 2 through 5, the three-phase motor 12 is schematically illustrated and the three wires 15a, 15b and 15c of power cable 15 are separately shown. The control panel 16 is shown by dashed lines and is connected through a power disconnect switch 17 to an appropriate source of three-phase power.

Referring now to FIGURE 2, the basic concept and arrangement employed in this invention is diagrammatically shown. A signalling means 18 is positioned within motor 12 in any convenient location and is electrically connected through conductors 19 and 20 to wires 15a and 15b of the power cable. Signalling means 18 contains the desired physical condition sensing device such as a temperature probe, heat responsive bimetallic switch, and/or a fluid pressure responsive device. Each of the sensing devices is appropriately integrated in the circuit of signalling means 18 to cause a change in the circuit such as through varying the effective value of a resistor or of a capacitor, opening or closing a switch, or inducing a voltage upon an appropriate change in the physical condition measured by that sensing device. Signalling means 18 may include any convenient type of electrical or electronic device for producing a distinctive electrical signal and superimposing this signal on the power current conducted through wires 15a and 15b. For example, this signal may be a direct current, or may be an alternating current of different phase or frequency than the power current. The electrical resistance of means 18 is relatively high to minimize the current passing therethrough. The signal that is superimposed by means 18 is varied by the sensing device upon variation in the physical condition measured by that sensing device.

Still referring to FIGURE 2, a detecting means 21 is provided in the control panel 16 and is electrically connected across wires 15a and 15b of the power cable. Detecting means 21 may be comprised of any conventional electrical or electronic components and circuits which are capable of detecting or measuring the electrical signal that was superimposed on the power current in wires 15a and 15b by the signalling means 18. The components of detector means 21 may then appropriately register or react to the signal that has been detected, and thereby indicate the particular physical condition observed by the sensing device in the signalling means 18. For example, if a temperature sensing device in signalling means 18 indicates overheating of the motor 12, the appropriate electrical signal will be detected by means 21 which in turn through conductors 22 and 23 will operate the motor control 24 to break the circuit and thereby protect the motor from overheating. Specific example of components which may be used in signalling means 18 and detecting means 21 will be hereinafter described with respect to FIGURES 3, 4 and 5, but it is to be understood and will be readily apparent to those skilled in the art that many types of components and circuits may be used for means 18 and 21 to accomplish the above-described functions.

Referring to FIGURE 3, a voltage bucking transformer is provided in the motor 12 with a primary winding 25 and a secondary winding 26 of equal number of turns. Primary winding 25 is connected directly across wires 15a and 15b and has a relatively high resistance so that the current through winding 25 is low. One end of winding 26 is connected to wire 15a, and the other end of winding 26 is coupled through a direct current source 27 and bimetallic switch 28 to wire 15b. The resistance of winding 26 is also relatively high. Bimetallic switch 28 may be very small due to the level of current which will be carried through the switch and, therefore, may be located in any critical portion of the motor 12 to respond to the first signs of overheating. Switch 28 may be of a normally open type which will close upon heating to a predetermined temperature indicating overheating. Direct current source 27 may be of any convenient types such as a battery or rectifier. Upon closing of bimetallic switch 28 a D.C. voltage is placed across wires 15a and 15b which causes a direct current through wires 15a and 15b superimposed upon the alternating power current. The windings 25 and 26 of the bucking transformer are arranged so that the energizing voltage across wires 15a and 15b is bucked to zero when switch 28 is closed and thus the bimetallic switch 28 is not subjected to this high voltage. A similar bucking transformer is provided in control panel 16 having a primary winding 29 and a secondary winding 30. Primary winding 29 is connected across wires 15a and 15b and secondary winding 30 is connected from wire 15a through the winding of a relay switch 31 to wire 15b. Windings 29 and 30 have an equal number of turns and are of a high resistance. The windings 29 and 30 are also arranged to buck the power voltage to zero. The direct current signal superimposed upon the power current upon the closing of bimetallic switch 28 will pass through the bucking transformer in control panel 16 and through the winding of relay 31 to activate the relay. Relay 31 may be either normally opened or normally closed and upon actuation will cause motor control 24 to break the power circuit and thereby protect motor 12 from overheating.

Referring now to FIGURE 4, appropriate components are shown for measuring the fluid pressure in the bottom portion of the well bore 10. A bucking transformer is provided in the motor 12 with primary winding 32 and secondary winding 33 having the same number of turns and each being positioned to oppose the voltage across the other. Primary winding 32 is connected directly across wires 15a and 15b. One end of secondary winding 32 is connected to wire 15a, and the other end of winding 32 is coupled through a variable resistor 34 and direct current source 34a to wire 15b. The effective resistance of resistor 34 is varied by any convenient hydraulic or mechanical means responsive to variations in the fluid pressure in the well bore 10. Thus, for any given fluid pressure in the well bore 10, resistor 34 will have a particular resistance. By modulating the effective resistance of resistor 34 in response to variations in fluid pressure, the current through secondary winding 33 will be varied thereby varying the signal that is superimposed upon the power current in wires 15a and 15b. A second bucking transformer is provided in the control panel 16 having primary winding 35 and secondary winding 36. Primary winding 35 is connected directly across the power cable wires 15a and 15b and secondary winding 36 is connected from wire 15a through a detecting device 37 to wire 15b. The detecting device 37 may be of any conventional type of voltage indicator to quantitatively interpret the signal superimposed upon the power cable. By appropriately calibrating device 37 and resistor 34, the pressure to which resistor 34 is responding may be read on device 37.

Referring now to FIGURE 5, an arrangement of components is shown for providing overheat protection for the motor as well as indicating the fluid pressure in the well bore. A bucking transformer is provided in motor 12 having a primary winding 38 and a secondary winding 39. Primary winding 38 is connected directly across wires 15a and 15b of the power cable. One side of winding 39 is connected to wire 15a and the other side is connected through direct current source 40 and the parallel-connected bimetallic switch 41 and variable resistor 42 to wire 15b. Bimetallic switch 41 may be substantially similar to previously described bimetallic switch 28 and is preferably normally open, closing only upon sensing excessive heat. Variable resistor 42 may be substantially the same as variable resistor 34 and function in the same manner to indicate the downhole fluid pressure. A bucking transformer is provided in control panel 16 having a primary winding 43 and a secondary winding 44. A voltage indicating device 46 and the winding of a relay 47 are connected in parallel and are connected between wire 15b and one end of the secondary winding 44. The other end of secondary winding 44 is connected to wire 15a and primary winding 43 is connected directly across wires 15a and 15b. When motor 12 is operating at or below a safe temperature bimetallic switch 41 will be open and variation of the effective resistance of variable resistor 42 will produce a signal on wires 15a and 15b that may be indicated on voltage indicator 46. When motor 12 reaches the upper limits of safe operating temperatures, bimetallic switch 41 will close thereby short circuiting variable resistor 42 to produce a different direct current signal superimposed on the power current in wires 15a and 15b. This signal will actuate relay 47 to disconnect a circuit breaker in motor control 24. Thus, it may be seen that the downhole fluid pressure is indicated on voltage indicator 46 until such time as the motor becomes overheated and then the pressure sensing means, resistor 42, will be over-ridden by the temperature sensing means, bimetallic switch 41, to disconnect the energizing circuit.

Thus, it may be seen that by this invention there is provided a device and arrangement for indicating a physical condition at one location which has been sensed at a far removed location by using ordinary power cables without the necessity of using separate wires for the sensing and indicating system. This is particularly advantageous in overheat protection of a submersible motor used in a deep well due to the size of the electric motor and the length of the power cable which is needed. Although specific components have been described for sensing the particular physical condition, producing a signal and superimposing this signal upon the power current, detecting the signal from the normal power current, and appropriately indicating or reacting to the signal, it will be readily apparent to those skilled in the art that various substitutions and modifications may be made for producing these functions.

Having fully described my invention it is to be understood that I do not wish to be limited to the details herein set forth or to the details illustrated in the drawings, but my invention is of the full scope of the appended claims.

I claim:

1. A device for above-ground indication of a physical condition present at a three phase submersible electric motor positioned in a well bore, comprising: a power cable having three wires coupling the motor to an above-ground power distribution system, a sensing element associated with the motor for responding to such physical condition, a first bucking transformer associated with the motor and having primary and secondary windings, said primary winding being connected from a first of said wires to a second of said wires, one end of said secondary winding be coupled to said first wire and the other end of said secondary winding being coupled through said sensing element to said second wire, said sensing element being operable to vary the electrical current in said secondary winding in a predetermined manner upon variation of the physical condition sensed by said sensing element, said varying electrical current in said secondary winding superimposing an electrical signal current on the electrical power current in said first and second wires, a second bucking transformer located above-ground and having primary and secondary windings each coupled between said first and second wires, and means coupled in series with said secondary winding of said second transformer for responding to said superimposed electrical signal current for operation of a circuit breaking means.

2. A device for above-ground power disconnect upon overheating of a three phase submersible electric motor positioned in a well bore, comprising: a power cable having three wires for coupling the motor to an above-ground power distribution system, a temperature sensing element associated with the motor for responding to overheating of the motor, a first bucking transformer associated with the motor and having primary and secondary windings, said primary winding being coupled between a first and a second of said wires, one end of said secondary winding being coupled to said first wire and the other end of said secondary winding being coupled through said sensing element to said second wire, said sensing element being operable to vary the electrical current in said secondary winding in a predetermined manner upon overheating of the motor, said varying electrical current in said secondary winding superimposing an electrical signal current on the electrical power current in said first and second wires, a second bucking transformer located above-ground and having primary and secondary windings each coupled between said first and second wires, and means coupled in series with said secondary winding of said second transformer for responding to the superimposed electrical signal current and interrupting the connection to the power distribution system upon overheating of the motor as indicated by a predetermined superimposed electrical signal current.

3. A device for above-ground power disconnect upon overheating of a three phase submersible electric motor positioned in a well bore, comprising: a power cable having three wires for coupling the motor to an above-ground power distribution system, a normally open bimetallic switch associated with the motor for closing upon overheating of the motor, means for providing a direct current potential difference associated with the motor, a first bucking transformer associated with the motor and having primary and secondary windings, said primary winding being coupled between a first and a second of said wires, one end of said secondary winding being coupled to said first wire and the other end of said secondary winding being coupled through said means for providing the direct current potential difference and said bimetallic switch in series to said second wire, said bimetallic switch closing upon overheating of the motor to allow the means for providing the direct current potential difference to send a direct current through said secondary winding and thereby superimpose a direct current signal on the power current in said first and second wires, a second bucking transformer located above-ground and having primary and secondary windings each coupled between said first and second wires, relay switch means coupled in series with said secondary winding of said second transformer for responding to said superimposed direct current signal, and circuit breaker means controlled by said relay switch means for interrupting the flow of power current upon said relay switch means responding to said superimposed direct current signal.

4. A device for above-ground indication of the downhole pressure present at a three phase submersible electric motor positioned in a well bore, comprising: a power cable having three wires for coupling the motor to an above-ground power distribution system, a pressure sensing element associated with the motor for responding to the fluid pressure outside of the motor, said element including a variable resistor, a first bucking transformer associated with the motor and having primary and secondary windings, said primary winding being coupled between a first and a second of said wires, one end of said secondary winding being coupled to said first wire and the other end of said secondary winding being coupled through said variable resistor to said second wire, said variable resistor of said sensing element being operable to vary the electrical current in said secondary winding in a predetermined manner upon variation of the fluid pressure sensed by said sensing element, said varying electrical current in said secondary winding superimposing an electrical signal current on the electrical power current in said first and second wires, a second bucking transformer located above-ground and having primary and secondary windings each coupled between said first and second wires, and means coupled in series with said secondary winding of said second transformer for responding to said superimposed electrical signal current for indicating the fluid pressure sensed by said sensing element.

5. A device for above-ground indication of the downhole fluid pressure and overheat protection of a three phase submersible electric motor positioned in a well bore, comprising: a power cable having three wires for coupling the motor to an above-ground power distribution system, a normally open bimetallic switch associated with the motor for closing upon overheating of the motor, a pressure sensing element associated with the motor for responding to the fluid pressure outside of the motor, said element including a variable resistor means for establishing a direct current potential difference, a first bucking transformer associated with the motor and having primary and secondary windings, said primary winding being coupled between a first and a second of said wires, one end of said secondary winding being coupled to said first wire and the other end of said secondary winding being coupled to said means for establishing the direct current potential difference, said bimetallic switch and variable resistor being coupled in parallel and the resultant parallel circuit being coupled between said means for establishing the direct current potential difference and to said second wire, said variable resistor of said sensing element being operable to vary the electrical current in said secondary winding in a predetermined manner upon variation of the fluid pressure sensed by said sensing element, said bimetallic switch closing upon overheating of the motor to override said variable resistor and send a predetermined direct current signal through said secondary winding, said varying electrical current in said secondary winding superimposing an electrical signal current on the electrical power current in said first and second wires, a second bucking transformer located aboveground and having primary and secondary windings each coupled between said first and second wires, and means coupled in series with said secondary winding of said second transformer for responding to said superimposed electrical signal current.

6. For use with a system in which an electrical utilization device at a first location is coupled to a plurality of electrical conductors which extend from said first location to a second location remote from the first, a system for providing an electrical signal connoting a physical condition adjacent said first location and for passing such signal over a circuit including at least one of said electrical conductors to the second location, comprising:

a sensing arrangement disposed at said first location and coupled to at least one of said conductors including a first sensing means arranged for incremental movement responsive to a related incremental variation in said physical condition, and a second sensing means arranged for movement between first and second positions responsive to related changes in the value of a physical condition;

response means disposed at said second location and coupled at least to said one conductor for providing an indication of the position of at least one of said first and second sensing means responsive to receipt of an information-connoting signal; and circuit means, including means for inserting a potential difference in circuit with said response means and with both first and second sensing means, for establishing an information-connoting signal at said first location responsive to movement of one of said first and second sensing means, which signal is transferred over the circuit including said one electrical conductor to said response means to provide the desired indication.

References Cited by the Examiner
UNITED STATES PATENTS

| | | | |
|---|---|---|---|
| 1,676,680 | 7/1928 | Bethenod | 317—29 X |
| 1,718,980 | 7/1929 | Ringwald. | |
| 1,874,142 | 8/1932 | Tingley | 317—29 |
| 3,072,827 | 1/1963 | Benish | 340—310 X |
| 3,175,608 | 3/1965 | Wilson | 166—55.1 |
| 3,204,245 | 8/1965 | Dykaar | 340—220 |

MILTON O. HIRSHFIELD, *Primary Examiner.*

SAMUEL BERNSTEIN, STEPHEN W. CAPELLI,
*Examiners.*

R. V. LUPO, *Assistant Examiner.*